United States Patent
Tonooka et al.

(10) Patent No.: US 9,406,328 B2
(45) Date of Patent: Aug. 2, 2016

(54) SOFT MAGNETIC UNDERLAYER HAVING HIGH TEMPERATURE ROBUSTNESS FOR HIGH AREAL DENSITY PERPENDICULAR RECORDING MEDIA

(71) Applicant: HGST Netherlands B.V., Amsterdam (NL)

(72) Inventors: Shun Tonooka, Odawara (JP); Masayoshi Shimizu, Chigasaki (JP); Hiroyuki Nakagawa, Yokohama (JP); Kiwamu Tanahashi, Tokyo (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/446,193

(22) Filed: Jul. 29, 2014

(65) Prior Publication Data

US 2016/0035380 A1 Feb. 4, 2016

(51) Int. Cl.
*G11B 5/706* (2006.01)
*G11B 5/667* (2006.01)
*G11B 5/716* (2006.01)
*G11B 5/65* (2006.01)
*G11B 5/66* (2006.01)

(52) U.S. Cl.
CPC *G11B 5/667* (2013.01); *G11B 5/65* (2013.01); *G11B 5/66* (2013.01); *G11B 5/706* (2013.01); *G11B 5/70605* (2013.01); *G11B 5/716* (2013.01)

(58) Field of Classification Search
CPC .......... G11B 5/73; G11B 5/731; G11B 5/732; G11B 5/738; G11B 5/706; G11B 5/70605; G11B 5/716
USPC .......... 360/135; 428/828, 828.1, 829
See application file for complete search history.

(56) References Cited

U.S. PATENT DOCUMENTS

| | | | |
|---|---|---|---|
| 8,687,309 B2 * | 4/2014 | Mabuchi et al. | 360/55 |
| 2012/0154948 A1 * | 6/2012 | Tamai et al. | 360/75 |
| 2012/0300600 A1 * | 11/2012 | Kanbe et al. | 369/13.32 |
| 2014/0106065 A1 * | 4/2014 | Maeda | G11B 5/65 427/130 |
| 2015/0085628 A1 * | 3/2015 | Niwa et al. | 369/13.11 |
| 2015/0117166 A1 * | 4/2015 | Zhang et al. | 369/13.5 |
| 2015/0310884 A1 * | 10/2015 | Arnoldussen | G11B 5/667 360/75 |

* cited by examiner

*Primary Examiner* — Jefferson Evans
(74) *Attorney, Agent, or Firm* — Zilka-Kotab, PC

(57) ABSTRACT

In one embodiment, a perpendicular magnetic recording medium includes: a substrate; and a soft magnetic underlayer structure positioned above the substrate, where the soft magnetic underlayer includes: a coupling layer; a first soft underlayer positioned above the coupling layer; and a second soft underlayer positioned below the coupling layer, where a difference between a magnetic flux density of the soft magnetic underlayer structure at 25° C. and a magnetic flux density of the soft underlayer structure at 85° C. is less than or equal to about 10% of the magnetic flux density of the soft magnetic underlayer structure at 25° C.

18 Claims, 8 Drawing Sheets

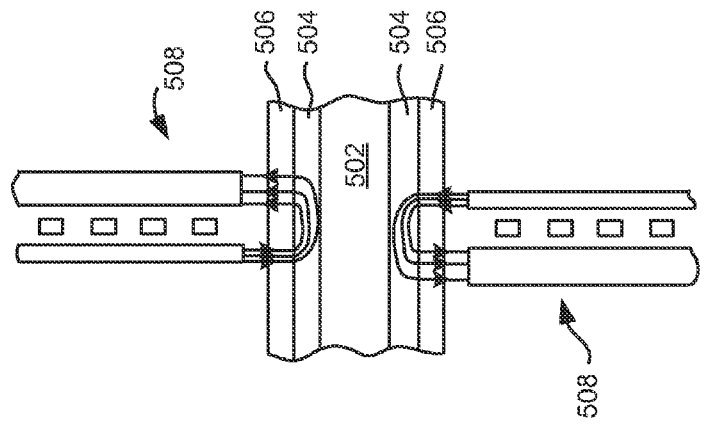
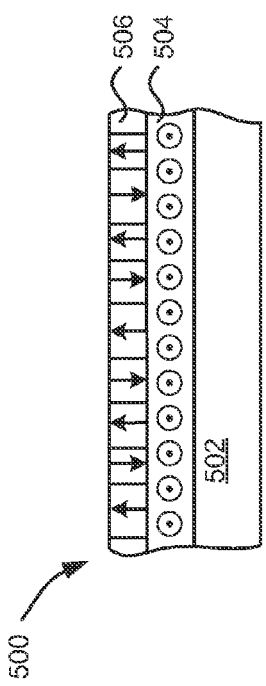

SOFT MAGNETIC UNDERLAYER HAVING HIGH TEMPERATURE ROBUSTNESS FOR HIGH AREAL DENSITY PERPENDICULAR RECORDING MEDIA

FIELD OF THE INVENTION

The present invention relates to data storage systems, and more particularly, this invention relates to a soft magnetic underlayer having high temperature robustness for use in perpendicular magnetic recording media.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air having a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. Accordingly, an important and ongoing goal involves increasing the amount of information able to be stored in the limited area and volume of HDDs. Increasing the areal recording density of HDDs provides one technical approach to achieve this goal.

A real density, e.g., as measured in bits per square inch, may be defined as the product of the track density (the tracks per inch radially on the magnetic medium, such as a disk) and the linear density (the bits per inch along each track). For a disk, the bits are written closely-spaced to form circular tracks on the disk surface, where each of the bits may comprise an ensemble of magnetic grains.

An important factor relevant to track density is the magnetic write width (MWW). The magnetic write width determines the track width of a magnetic bit recorded by the write/main pole of the write head. Thus, the smaller the magnetic core width, the greater the number of tracks of data that can be written to the media. Stated another way, high track density is associated with a narrow magnetic write width. However, writing narrower tracks generally involves narrowing the width of the poles on the read/write head, which ultimately reduces the strength of the head's write field. Unfortunately, weaker head write fields may result in a degradation of the writeability (e.g., the ability to switch the magnetization of the recording bits).

Perpendicular magnetic recording media typically have a layered structure in which the following layers may be stacked in succession on a substrate: a soft magnetic underlayer (SUL), a nonmagnetic intermediate layer, a recording layer, a carbon overcoat layer, and a lubricant layer. Most perpendicular recording media have a SUL with an antiferromagnetic coupling (AFC) structure in which two layers having amorphous magnetic alloys therein are antiferromagnetically coupled through a very thin coupling layer including a Ru or Ru alloy. A SUL with an AFC structure is known to provide lower noise than a SUL having no AFC structure. One of the most effective ways to improve writeability in the perpendicular magnetic recording media is to decrease the saturation magnetic flux density (Bs) of the SUL. For instance, a SUL, particularly a SUL with an AFC structure, that has a lower Bs also has a higher magnetic permeability. The writeability of a perpendicular magnetic media may therefore be improved by decreasing the Bs of the SUL, particularly a SUL with an AFC structure. Accordingly, a SUL with low Bs may be preferable for perpendicular recording media that is used in conjunction with a narrow track magnetic recording head (i.e., a recording head associated with a narrow magnetic write width and a weak write field). In current practice, the majority of perpendicular recording media have a SUL with a Bs below 1 Tesla.

However, there is currently a deficiency in SULs that have optimum low magnetic flux densities at higher temperatures. In general, the Bs associated with a SUL decreases at a higher rate with increasing temperature, which may be particularly problematic for SULs that have a low initial Bs at ambient temperatures. In other words, a SUL with a Bs that is optimum at room temperature may not be optimum at high temperature. If the Bs of a SUL becomes too low with increasing temperature, the writeability may be degraded because the magnetic moment in the SUL at high temperature will be saturated by the head field. Indeed, some of the recent perpendicular recording media exhibit poor writeability at high temperature. Accordingly, this deficiency in SULs that have optimum low magnetic flux densities at higher temperatures significantly impacts which media may be used in high temperature conditions, such as vehicle storage systems. As such, to achieve high areal density using a low-Bs SUL there is currently a need in the art to suppress the decreasing rate of magnetic flux density (Bs) with increasing temperature.

SUMMARY

According to one embodiment, a perpendicular magnetic recording medium includes: a substrate; and a soft magnetic underlayer structure positioned above the substrate, where the soft magnetic underlayer includes: a coupling layer; a first soft underlayer positioned above the coupling layer; and a second soft underlayer positioned below the coupling layer, where a difference between a magnetic flux density of the soft magnetic underlayer structure at 25° C. and a magnetic flux density of the soft underlayer structure at 85° C. is less than or equal to about 10% of the magnetic flux density of the soft magnetic underlayer structure at 25° C.

According to another embodiment, a perpendicular magnetic recording medium includes: a substrate; and a soft magnetic underlayer structure positioned above the substrate, the soft magnetic underlayer structure including: a coupling layer including a Ru or a Ru-based alloy; a first soft underlayer positioned above the coupling layer; and a second soft underlayer positioned below the coupling layer, where a difference between a magnetic flux density of the soft magnetic underlayer structure at 25° C. and a magnetic flux density of the soft underlayer structure at 85° C. is less than or equal to about 10% of the magnetic flux density of the soft magnetic underlayer structure at 25° C., where the soft magnetic underlayer structure has a thickness in a range between about 5 nm to about 40 nm, and where the perpendicular magnetic recording medium is a hard disk.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 5A is a schematic representation of a perpendicular recording medium, according to one embodiment.

FIG. 5B is a schematic representation of a recording head and the perpendicular recording medium of FIG. 5A, according to one embodiment.

FIG. 5C is a schematic representation of a recording apparatus configured to record separately on both sides of a perpendicular recording medium, according to one embodiment.

DETAILED DESCRIPTION

Figure 1:
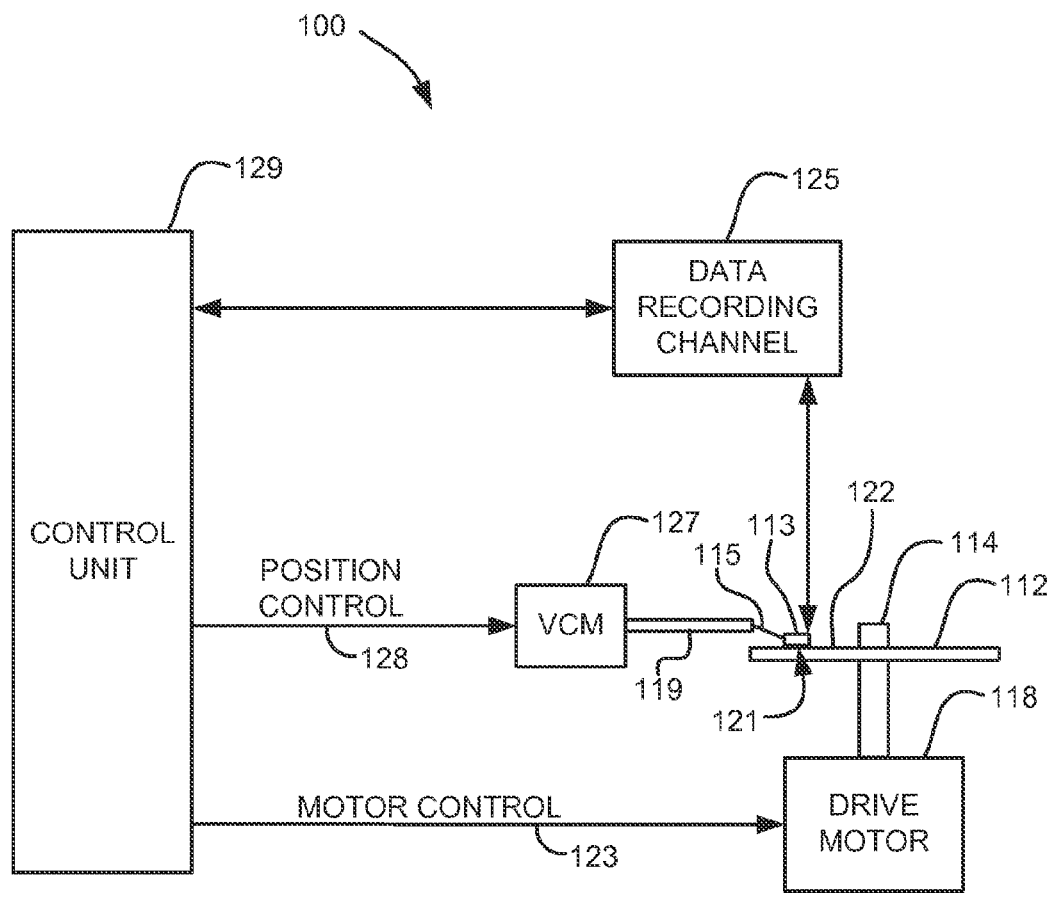
FIG. 1 is a simplified drawing of a magnetic recording disk drive system, according to one embodiment.

The following description is made for the purpose of illustrating the general principles of the present invention and is not meant to limit the inventive concepts claimed herein.

Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approach the terra "about" when combined with a value, refers to plus and minus 10% of the reference value. For example, a thickness of about 10 nm refers o a thickness of 10 nm±1 nm.

The following description discloses several preferred embodiments of magnetic storage systems and/or related systems and methods, as well as operation and/or component parts thereof.

As discussed above, one way to improve the writeability of perpendicular magnetic recording media is to incorporate a soft underlayer (SUL) that has a low magnetic flux density (Bs) at room temperature. However, the Bs of a SUL typically decreases as temperature increases and may thus become too low to achieve acceptable and/or good writeability at higher temperatures due to saturation of the SUL magnetic moment by the head field.

Embodiments disclosed herein overcome the aforementioned drawbacks by improving the writeability of a perpendicular magnetic recording medium at both room and high temperatures in approaches where a low-Bs SUL is incorporated therein. In various approaches, the decreasing rate of Bs with increasing temperature may be successfully suppressed by carefully selecting the alloy(s) in the SUL, as well as selecting the effective amount of the elements in said alloy(s) to achieve improved writeability of the medium at room temperature and high temperature. For instance, in preferred approaches, a perpendicular magnetic recording medium may include a SUL comprising two magnetic alloys antiferromagnetically coupled via a Ru and/or Ru alloy coupling layer, where the difference between the Bs of the SUL at 25° C. and 85° C. may be less than about ±10% of the Bs of the SUL at 25° C. Embodiments disclosed herein may be particularly suited for perpendicular recording media for HDDs, which are generally used in high temperature conditions such as in vehicle storage systems.

Following are several examples of general and specific embodiments relating to the use, manufacture, structure, properties, etc. of perpendicular magnetic recording media which include a soft underlayer having high temperature robustness and which may achieve an areal recording density of at least 750 Gb/in².

According to one general embodiment, a perpendicular magnetic recording medium includes: a substrate; and a soft magnetic underlayer structure positioned above the substrate, where the soft magnetic underlayer includes: a coupling layer; a first soft underlayer positioned above the coupling layer; and a second soft underlayer positioned below the coupling layer, where a difference between a magnetic flux density of the soft magnetic underlayer structure at 25° C. and a magnetic flux density of the soft underlayer structure at 85° C. is less than or equal to about 10% of the magnetic flux density of the soft magnetic underlayer structure at 25° C.

According to another general embodiment, a perpendicular magnetic recording medium includes: a substrate; and a soft magnetic underlayer structure positioned above the substrate, the soft magnetic underlayer structure including: a coupling layer including a Ru or a Ru-based alloy; a first soft underlayer positioned above the coupling layer; and a second soft underlayer positioned below the coupling layer, where a difference between a magnetic flux density of the soft magnetic underlayer structure at 25° C. and a magnetic flux density of the soft underlayer structure at 85° C. is less than or equal to about 10% of the magnetic flux density of the soft magnetic underlayer structure at 25° C., where the soft magnetic underlayer structure has a thickness in a range between about 5 nm to about 40 nm, and where the perpendicular magnetic recording medium is a hard disk.

Referring now to FIG. 1, there is shown a disk drive 100 in accordance with one embodiment of the present invention. As shown in FIG. 1, at least o e rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data rack on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
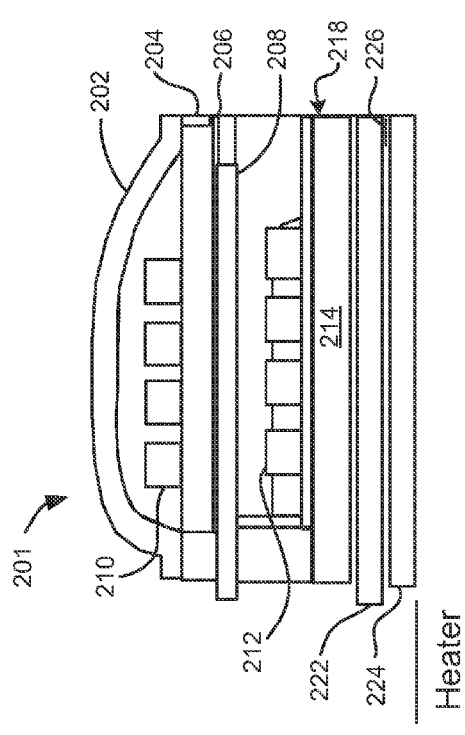
FIG. 2A is a cross-sectional view of a perpendicular magnetic head with helical coils, according to one embodiment.

FIG. 2A is a cross-sectional view of a perpendicular magnetic head 200, according to one embodiment. In FIG. 2A, helical coils 210 and 212 are used to create magnetic flux in the stitch pole 208, which then delivers that flux to the main pole 206. Coils 210 indicate coils extending out from the page, while coils 212 indicate coils extending into the page. Stitch pole 208 may be recessed from the ABS 218. Insulation 216 surrounds the coils and may provide support for some of the elements. The direction of the media travel, as indicated by the arrow to the right of the structure, moves the media past the lower return pole 214 first, then past the stitch pole 208, main pole 206, trailing shield 204 which may be connected to the wrap around shield (not shown), and finally past the upper return pole 202. Each of these components may have a portion in contact with the ABS 218. The ABS 218 is indicated across the right side of the structure.

Perpendicular writing is achieved by forcing flux through the stitch pole 208 into the main pole 206 and then to the surface of the disk positioned towards the ABS 218.

Figure 2B:
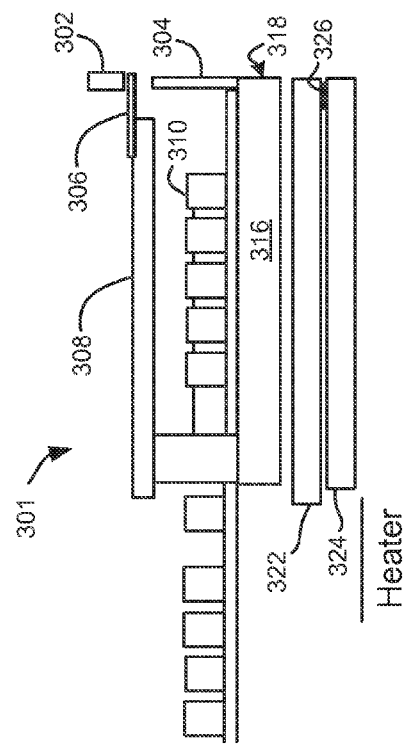
FIG. 2B is a cross-sectional view a piggyback magnetic head with helical according to one embodiment.

FIG. 2B illustrates one embodiment of a piggyback magnetic head 201 having similar features to the head 200 of FIG. 2A. As shown in FIG. 2B, two shields 204, 214 flank the stitch pole 208 and main pole 206. Also sensor shields 222, 224 are shown. The sensor 226 is typically positioned between the sensor shields 222, 224.

Figure 3A:
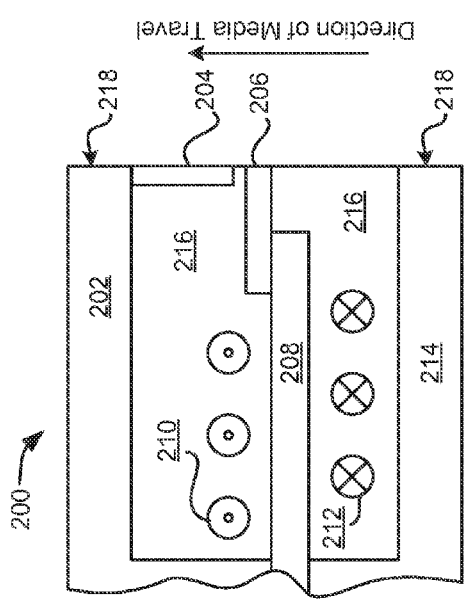
FIG. 3A is a cross-sectional view of a perpendicular magnetic head with looped coils, according to one embodiment.

FIG. 3A is a schematic diagram of another embodiment of a perpendicular magnetic head 300, which uses looped coils 310 to provide flux to the stitch pole 308, a configuration that is sometimes referred to as a pancake configuration. The stitch pole 308 provides the flux to the main pole 306. With this arrangement, the lower return pole may be optional. Insulation 316 surrounds the coils 310, and may provide support for the stitch pole 308 and main pole 306. The stitch pole may be recessed from the ABS 318. The direction of the media travel, as indicated by the arrow to the right of the structure, moves the media past the stitch pole 308, main pole 306, trailing shield 304 which may be connected to the wrap around shield (not shown), and finally past the upper return pole 302 (all of which may or may not have a portion in contact with the ABS 318). The ABS 318 is indicated across the right side of the structure. The trailing shield 304 may be in contact with the main pole 306 in some embodiments.

Figure 3B:
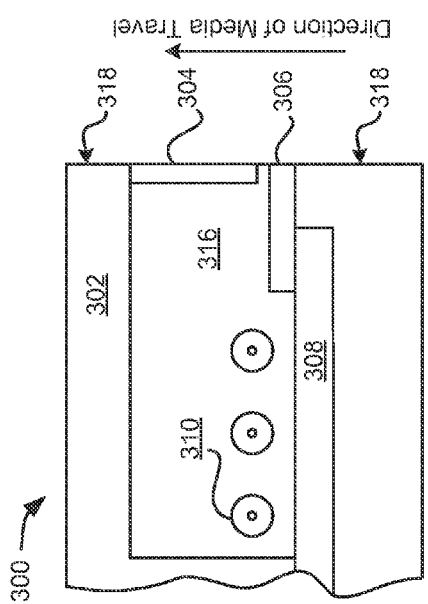
FIG. 3B is a cross-sectional view of a piggyback magnetic head with looped coils, according to one embodiment.

FIG. 3B illustrates another embodiment of a piggyback magnetic head 301 having similar features to the head 300 of FIG. 3A. As shown in FIG. 3B, the piggyback magnetic head 301 also includes a looped coil 310, which wraps around to form a pancake coil. Sensor shields 322, 324 are additionally shown. The sensor 326 is typically positioned between the sensor shields 322, 324.

In FIGS. 2B and 3B, an optional heater is shown near the non-ABS side of the magnetic head. A heater (Heater) may also be included in the magnetic heads shown in FIGS. 2A and 3A. The position of this heater may vary based on design parameters such as where the protrusion is desired, coefficients of thermal expansion of the surrounding layers, etc.

Figure 4A:
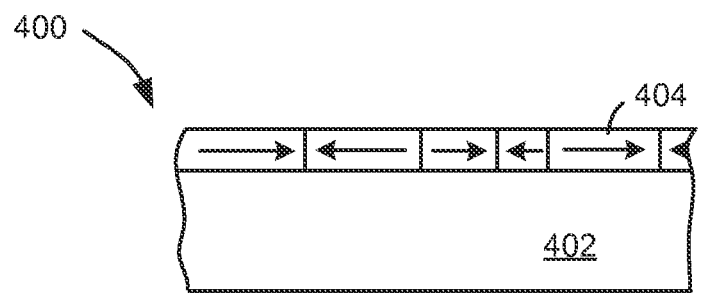
FIG. 4A is a schematic representation of a section of a longitudinal recording medium, according to one embodiment.

FIG. 4A provides a schematic illustration of a longitudinal recording medium 400 typically used with magnetic disc recording systems, such as that shown in FIG. 1. This longitudinal recording medium 400 is utilized for recording magnetic impulses in (or parallel to) the plane of the medium itself. This longitudinal recording medium 400, which may be a recording disc in various approaches, comprises at least a supporting substrate 402 of a suitable non-magnetic material such as glass, and a conventional magnetic recording layer 404 positioned above the substrate.

Figure 4B:
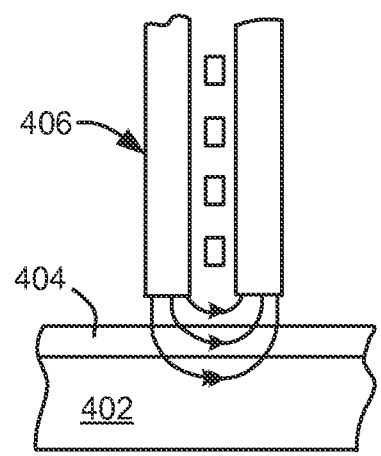
FIG. 4B is a schematic representation of a magnetic recording head and the longitudinal recording medium of FIG. 4A, according to one embodiment.

FIG. 4B shows the operative relationship between a recording/playback head 406, which may preferably be a thin film head and/or other suitable head as would be recognized by one having skill in the art upon reading the present disclosure, and the longitudinal recording medium 400 of FIG. 4A.

Improvements in longitudinal recording media have been limited due to issues associated with thermal stability and recording field strength. Accordingly, pursuant to the current push to increase the areal recording density of recording media, perpendicular recording media (PMR) has been developed. FIG. 5A provides a simplified schematic diagram of a perpendicular recording medium 500, which may also be used with magnetic disc recording systems, such as that shown in FIG. 1. As shown in FIG. 5A, the perpendicular recording medium 500, which may be a recording disc in various approaches, comprises at least a supporting substrate 502 of a suitable non-magnetic material (e.g., glass, aluminum, etc.), and a soft underlayer 504 of a material having a high magnetic permeability positioned above the substrate 502. The perpendicular recording medium 500 also includes a magnetic recording layer 506 positioned above the soft underlayer 504, where the magnetic recording layer 506 preferably has a high coercivity relative to the soft underlayer 504. There may be one or more additional layers present (not shown), such as an "exchange-break" layer or "interlayer", between the soft underlayer 504 and the magnetic recording layer 506.

The orientation of magnetic impulses in the magnetic recording layer 506 is substantially perpendicular to the surface of the recording layer. The magnetization of the soft underlayer 504 is oriented in (or parallel to) the plane of the soft underlayer 504. As particularly shown in FIG. 5A, the in-plane magnetization of the soft underlayer 504 may be represented by an arrow extending into the paper.

FIG. SB illustrates the operative relationship between a perpendicular head 508 and the perpendicular recording medium 500 of in FIG. 5A. As shown in FIG. 5A, the magnetic flux 510, which extends between the main pole 512 and return pole 514 of the perpendicular head 508, loops into and out of the magnetic recording layer 506 and soft underlayer 504. The soft underlayer 504 helps focus the magnetic flux 510 from the perpendicular head 508 into the magnetic recording layer 506 in a direction generally perpendicular to the surface of the magnetic medium. Accordingly, the intense magnetic field generated between the perpendicular head 508 and the soft underlayer 504, enables information to be recorded in the magnetic recording layer 506. The magnetic flux is further channeled by the soft underlayer 504 back to the return pole 514 of the head 508.

As noted above, the magnetization of the soft underlayer 504 is oriented in (parallel to) the plane of the soft underlayer 504, and may represented by an arrow extending into the paper. However, as shown in FIG. 5B, this in plane magnetization of the soft underlayer 504 may rotate in regions that are exposed to the magnetic flux 510.

FIG. 5C illustrates one embodiment of the structure shown in FIG. 5B, where soft underlayers 504 and magnetic recording layers 506 are positioned on opposite sides of the substrate 502, along with suitable recording heads 508 positioned adjacent the outer surface of the magnetic recording layers 506, thereby allowing recording on each side of the medium.

Except as otherwise described herein with reference to the various inventive embodiments, the various components of the structures of FIGS. 1-5B, and of other embodiments described herein, may be of conventional materials and/or design, and be fabricated using conventional techniques, as would be understood by one skilled in the art upon reading the present disclosure.

Figure 6:
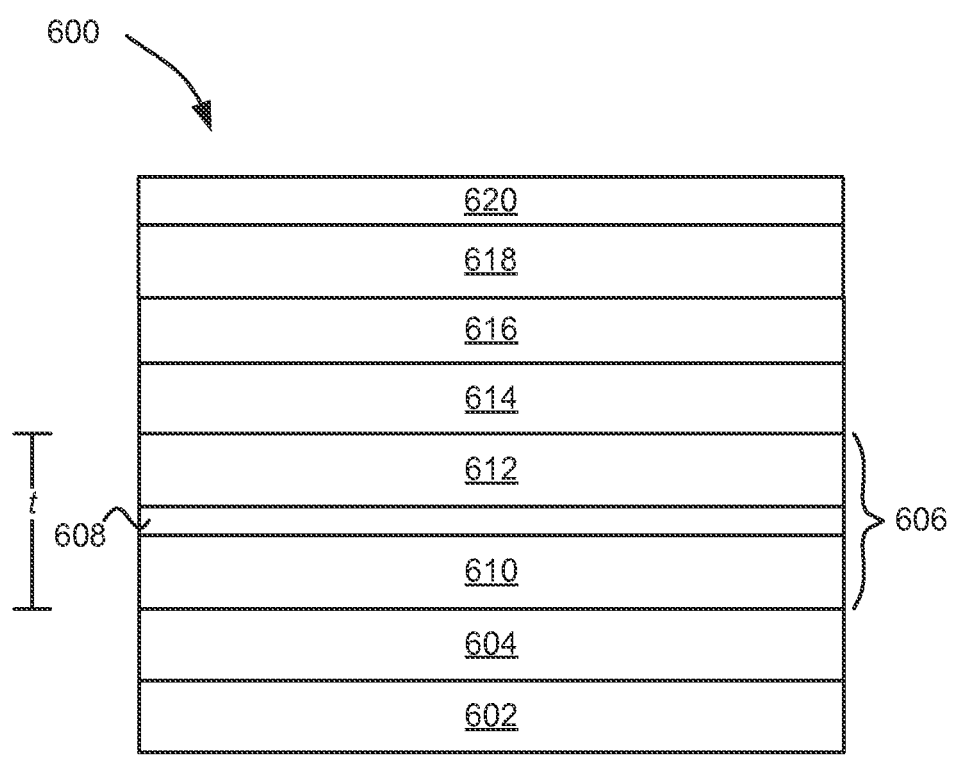
FIG. 6 is a schematic representation of a perpendicular magnetic medium, according to one embodiment.

Referring now to FIG. 6, a perpendicular magnetic medium 600 is shown according to one embodiment. As an option, the magnetic medium 600 may be implemented in conjunction with features from any other embodiment listed herein, such as those described with reference to the other FIGS. Of course, the magnetic medium 600, and others presented herein may be used in various applications and/or in permutations which may or may not be specifically described in the illustrative embodiments listed herein. For instance, various embodiments of the magnetic medium 600 may include more or less layers than those shown in FIG. 6. Further, the magnetic medium 600 and others presented herein may be used in any desired environment, As shown in FIG. 6, the magnetic recording medium 600 includes a substrate layer 602 comprising a material of high rigidity, such as glass, Al, $Al_2O_3$, MgO, Si, or other suitable substrate material as would be understood by one having skill in the art upon reading the present disclosure.

As also shown in FIG. 6, an adhesion layer 604 is present above the substrate layer 602. In various approaches, the adhesion layer 604 may comprise Ta, Ni, Ti, and/or alloys thereof. In preferred approaches, the adhesion layer 604 comprises an amorphous material that does not affect the crystal orientation of the layers deposited thereon. The thickness of the adhesion layer 604 is preferably in the range of about 2 nm to 40 nm. If the thickness of the adhesion layer 604 is less than about 2 nm, the adhesive effect of the adhesion layer 604 may be poor, whereas a thickness greater than about 40 nm reveals no significant improvement in performance yet reduces the adhesive effect thereof, which is undesirable.

As further shown in FIG. 6, a soft magnetic underlayer (SUL) structure 606 may be positioned above the adhesion layer 604. The SUL structure may be configured to suppress the broadening of the magnetic field produced by the magnetic head and to effectively magnetize the recording layers 618 positioned thereabove. In various approaches, a thickness, t, of the SUL structure may be in a range between about 5 nm to about 40 nm.

In preferred approaches, the SUL structure 606 includes a coupling layer 608 located between a first single SUL 610 and a second single SUL 612, where the first and second SULs 610, 612 each include at least one soft magnetic alloy. The coupling layer 608 is intended to induce an anti-ferromagnetic coupling (AFC) between the first and second SULs 610, 612. In various approaches, the coupling layer 608 may include Ru, a Ru-based alloy, or other suitable material as would be understood by one having skill in the art upon reading the present disclosure. In particular approaches, the thickness of the coupling layer 608 may be between about 0.2 nm to about 3 nm or other suitable thickness for which the AFC coupling can be maintained. For example, in approaches where the thickness of Ru or Ru-based alloy may be thinner than 0.2. nm, the AFC may be too strong and the permeability of the SUL structure 606 may then drop.

Consequently, writeability may become worse. Conversely, in approaches where the thickness of or Ru-based alloy may greater than 3 nm, the AFC may disappear and noise may then increase. It is important to note, however, that the thickness of the coupling layer 608 is not limited to the range between about 0.2 nm to about 3 nm, but may be higher or lower in some instances.

In some approaches, the at least one soft magnetic alloy present in the first and second SULs 610, 612 of the SUL structure 606 may be the same or different. In more approaches, the first SUL 610 and the second SUL 612 may each include a soft magnetic alloy comprising Co and Fe. In yet more approaches the first layer 610 and the second layer 612 may each include a soft magnetic alloy comprising Co or Fe as the main component with Ta, Nb, Zr, B, W or Cr, etc., added thereto.

In one approach where the first SUL 610 and/or the second SUL 612 of the SUL structure 606 include a soft magnetic alloy comprising at least Co and Fe, the composition of the soft magnetic alloy may satisfy the condition set forth in equation (1):

$$\frac{Co\_c}{[Co\_c + Fe\_c]} \geq 2 - 2 \cdot Bs(RT) \quad (1)$$

where Co_c represents the Co amount in atomic percent, Fe_c represents the Fe amount in atomic percent, and Bs(RT) represents the overall saturation magnetic flux density of the SUL structure 606 at 25° C. The condition described by equation (1) above indicates that, in such approaches, the Co amount in the soft magnetic alloy of the first SUL 610 and/or the second SUL 612 should be higher than the threshold determined by Bs(RT). One reason as to why the Co amount in the soft magnetic alloy should be higher than this Bs(RT) threshold is that Co has a higher Curie temperature than Fe. The Curie temperature of a magnetic material corresponds to the temperature at which the magnetic material loses its permanent or spontaneous magnetization. As Co has a higher Curie temperature than Fe, the overall Curie temperature of the soft magnetic alloy tends to be higher if the Co amount (e.g., atomic percentage) therein is high. Such a high overall Curie temperature may help suppress and/or slow the rate at which the Bs of the SUL structure 606 decreases at high temperatures.

In another approach, the magnetic flux density (Bs) of the SUL structure 606 may satisfy the condition set forth in equation (2):

$$0.008 \times MWW \leq Bs(RT) \leq 0.012 \times MWW \quad (2)$$

where MWW represents the magnetic write width (in nanometers) associated with the recording head, and Bs(RT) represents the magnetic flux density (in Teslas) of the SUL structure 606 at room temperature (25° C.). The condition specified by equation (2) above illustrates the correspondence between the MWW of the recording head and the writeability of the medium 600, which may be directly affected by the Bs(RT) of the SUL structure 606. For example, equation (2) illustrates that the optimum Bs(RT) of the SUL structure 606 may change depending on the MWW of the recording head. Accordingly, to achieve good writeability at room temperature in such approaches, the SUL structure 606 should have a Bs that satisfies the condition set forth in equation (2).

In yet another approach, the difference between the Bs of the SUL structure 606 at room temperature (e.g., 25° C.) versus the Bs of the SUL at high temperatures (e.g. 85° C.) may be less than or equal to about 10%. For instance, in this approach, the Bs of the SUL structure 606 at room and high temperatures may satisfy the condition set forth in equation (3):

$$\left\{\frac{Bs(RT) - Bs(HT)}{Bs(RT)}\right\} \leq 0.1 \quad (3)$$

where Bs(RT) represents the magnetic flux density of the SUL structure 606 at 25° C. an Bs(HT) represents the magnetic flux density of the SUL structure 606 at 85° C. As expressed in equation (3), if the SUL structure 606 has an optimum Bs at room temperature (i.e. an optimal Bs(RT)), the Bs of the SUL structure 606 at 85° C. should only decrease by less than or equal to about 10% of the Bs(RT). For illustrative purposes only, consider an example where the SUL structure 606 has an optimal Bs(RT) of 0.75 Tesla. In order to satisfy the condition set forth in equation (3), the difference between Bs(RT) and Bs(HT) may be less than or equal to 0.075; thus, the Bs(HT) of the SUL structure 606 may be 0.675 or less. In approaches where the condition set forth in equation (3) is satisfied, the magnetic moment of the SUL structure 606 will not be saturated at high temperatures, such as 85° C. In various approaches, the Bs of the SUL structure 606 may be measured by a magnetization process involving application of a magnetic field in an in-plane direction of the disk. A Vibrating Sample Magnetometer (VSM) may be used to perform this measurement in some approaches.

As additionally shown in FIG. 6, the perpendicular magnetic recording medium 600 includes a seed layer 614 positioned above the SUL structure 606. The seed layer 614 may be configured to promote the crystalline orientation and the grain size in the intermediate layer 616 and/or the magnetic recording layer 618 positioned thereabove. In some approaches, the seed layer 614 may include MgO. in other approaches, the seed layer 614 may include one or more cubic crystal compounds including but not limited to $SrTiO_3$, indium tin oxide (ITO), MnO, TiN, RuAl, etc., and/or alloys thereof, In more approaches, the seed layer 614 may include one or more body-centered cubic structure metals including but not limited to Cr, Mo, W, etc, and/or alloys thereof. In yet more approaches, the seed layer 614 may include one or more face-centered cubic structure metals including but not limited to Pt, Pd, Ni, Au, Ag, Cu, etc., and/or alloys thereof. Preferably, the thickness of the seed layer 614 may be in a range from about 2 nm to about 10 nm.

An intermediate layer 616 may also be positioned above the seed layer 614. This intermediate layer 616 may be configured to improve the crystallographic texture of the magnetic recording layer 618 positioned thereahove. For example, the intermediate layer 616 may help promote segregation of the non-magnetic material in the magnetic recording layer 618 into grain boundaries. In various approaches, the intermediate layer 616 may include Ru or other suitable material as would be understood by one having skill in the art upon reading the present disclosure. Preferably, the thickness of the intermediate layer 616 is in a range from about 4 nm to about 20 nm.

The magnetic recording layer 618 positioned above the intermediate layer 616 may include a granular ferromagnetic material, e.g. a material including a plurality of ferromagnetic grains. This granular ferromagnetic material may include, but is not limited to, Cr, Fe, Ta, Ni, Mo, Pt, W, Cr, Ru, Ti, Si, O, V, Nb, Ge, B, Pd. In some approaches, the granular ferromagnetic material may also include alloys comprising at least two of Co, Pt, Cr, Nb and Ta. In other approaches, the magnetic recording layer 618 may also be a multilayer film, for example with Co and Pd or Pt being alternately layered.

Individual ferromagnetic grains and/or magnetic islands (e.g. comprised of a plurality of the ferromagnetic grains) in the magnetic recording layer 618 may be separated by a non magnetic material (e.g., a segregant). The segregant may include oxides and/or nitrides of Ta, W, Nb, V, Mo, B, Si, Co, Cr, Ti, Al, etc., or C or Cr or any suitable nonmagnetic segregant material known in the art.

In particular approaches, the magnetic recording layer 618 may be a patterned magnetic recording layer. In patterned recording media, the ensemble of magnetic grains that form a bit are replaced with a single isolated magnetic region, or island, that may be purposefully placed in a location where the write transducer expects to find the bit in order to write information and here the readback transducer expects to detect the information stored thereto. To reduce the magnetic moment between the isolated magnetic regions or islands in order to form the pattern, magnetic material is destroyed, removed or its magnetic moment substantially reduced or eliminated, leaving nonmagnetic regions therebetween. There are two types of patterned magnetic recording media: discrete track media (DTM) and bit patterned media (BPM). For DTM, the isolated magnetic regions form concentric data tracks of magnetic material, where the data tracks are radially separated from one another by concentric grooves of non-magnetic material. In BPM, the isolated magnetic regions form individual bits or data islands which are isolated from one another by nonmagnetic material (e.g. a segregant). Each bit or data island in BPM includes a single magnetic domain, which may be comprised of a single magnetic grain or a few strongly coupled grains that switch magnetic states in concert as a single magnetic volume.

While not shown in FIG. 6, the perpendicular magnetic recording medium 600 may include one or more optional capping layers above the magnetic recording layer 618. The one or more capping layers may be configured to mediate the intergranular coupling of the magnetic grains present in the magnetic recording layer 618. The capping layer may include, for example, a Co—, CoCr—, CoPtCr—, and/or CoPtCrB— based alloy, or other material suitable for use in a capping layer as would be recognized by one having skill in the art upon reading the present disclosure. In some approaches, a first high magnetic anisotropy ($K_u$) capping layer including an oxide may be positioned above the magnetic recording layer 618, and a second low $K_u$ capping layer may be positioned above the first capping layer.

As further shown in FIG. 6, a protective overcoat layer 620 may positioned above the magnetic recording layer 618 and/ or the one or more capping layers if present. The protective overcoat layer 620 may be configured to protect the underlying layers from wear, corrosion, etc. This protective overcoat layer 620 may be made of, for example, diamond-like carbon, carbon-nitride, Si-nitride, BN or B4C, etc. or other such materials suitable for a protective overcoat as would be understood by one having the art on reading the present disclosure.

The perpendicular magnetic recording medium 600 may also include a lubricant layer (not shown in FIG. 6). The material of the lubricant layer may include, but is not limited to perfluoropolyether, fluorinated alcohol, fluorinated carboxylic acids, etc., or other suitable lubricant material known in the art.

The formation of the perpendicular magnetic recording medium 600 may be achieved via known deposition and processing techniques. For instance, deposition of each of the layers present in the perpendicular magnetic recording medium 600 may be achieved via sputter deposition, ion beam deposition, chemical vapor deposition, evaporation processes, or other such techniques as would be understood by one having skill in the art upon reading the present disclosure.

Experiments and Exemplary Embodiments

The following experiments describe various non-limiting exemplary embodiments of the perpendicular magnetic media described herein, particularly those including a soft magnetic underlayer having high temperature robustness. It is important to note that the following experiments and exemplary embodiments are for illustrative purposes only and do not limit the invention in anyway. It should also be understood that variations and modifications of these and exemplary embodiments may be made those skilled in the art without departing from the spirit and scope of the invention.

Exemplary Embodiment 1

Figure 7:
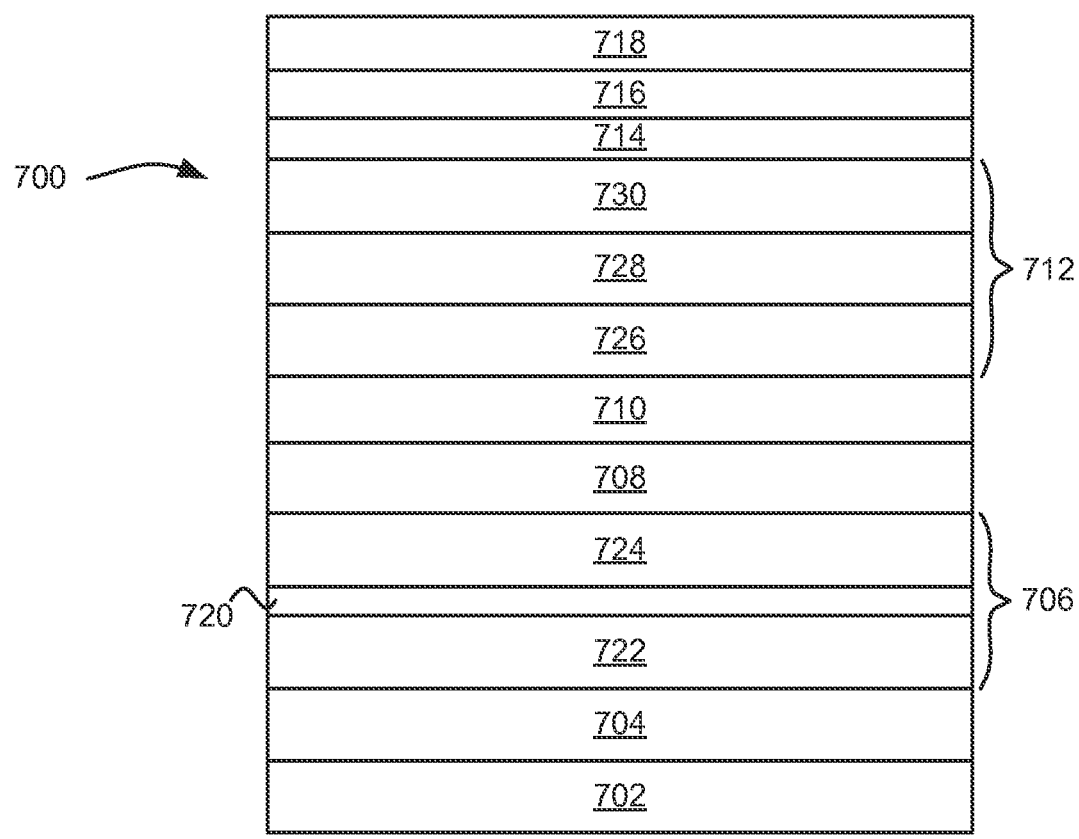
FIG. 7 is a schematic representation of a perpendicular magnetic medium, according to one embodiment.

FIG. 7 provides a schematic diagram illustrating a cross-section of a perpendicular magnetic recording medium 700, according to one illustrative embodiment. This perpendicular magnetic recording medium 700 was produced using a sputtering apparatus. All the chambers in the sputtering apparatus were first evacuated to a pressure of about $2 \times 10^{-5}$ Pa, after which a carrier with a substrate 702 mounted thereon was moved to each chamber in order to carry out successive processes (e.g. deposition processes, etc.). For instance, an adhesion layer 704, a soft magnetic underlayer (SUL) structure 706, seed layer 708, an intermediate layer 710, a granular recording layer 712, a ferromagnetic metal layer 714, and a diamond-like carbon (DLC) protective layer 716 was formed in succession on the substrate 702 using DC magnetron sputtering. Following this film deposition, a lubricant layer 718 was coated directly on the DLC protective layer 716.

As shown in FIG. 7, the adhesion layer 704 was deposited directly on the upper surface of the substrate 702. The adhesion layer 704 included a Ni-37.5Ta The thickness of the adhesion layer was 15 nm.

As also shown in FIG. 7, the SUL structure 706 was deposited directly on the upper surface of the adhesion layer 704. The SUL structure 706 possessed an anti-ferromagnetic coupling (AFC) structure, in which a very thin coupling layer 720 including Ru or a Ru-based alloy was positioned between a first single SUL 722 and a second single SUL 724. The first and second SULs each included a Co—Fe—Ta—Zr alloy. Several comparative examples were prepared in which the atomic percentages of the materials in the Co—Fe—Ta—Zr alloy were altered. The particular Co—Fe—Ta—Zr alloys used for these comparative examples are provided in Table 1 below.

TABLE 1

| | Co (at. %) | Fe (at. %) | Ta (at. %) | Zr (at. %) | Bs at 25° C. (Tesla) |
|---|---|---|---|---|---|
| Ex. 1-0 | 62.0 | 26.0 | 5.0 | 7.0 | 1.2 |
| Ex. 1-1 | 60.0 | 26.0 | 6.0 | 8.0 | 1.1 |
| Ex. 1-2 | 59.0 | 26.0 | 7.0 | 8.0 | 1.0 |
| Ex. 1-3 | 59.0 | 25.5 | 7.5 | 8.0 | 1.0 |
| Ex. 1-4 | 56.0 | 25.5 | 11.0 | 7.5 | 0.8 |
| Ex. 1-5 | 54.0 | 26.0 | 13.0 | 7.0 | 0.7 |
| Ex. 1-6 | 65.0 | 14.0 | 14.0 | 7.0 | 0.6 |
| Ex. 1-7 | 77.0 | 1.5 | 13.5 | 8.0 | 0.5 |
| Ex. 1-8 | 75.0 | 1.5 | 14.5 | 9.0 | 0.4 |

The total thickness of the SUL structure 706 was fixed at 30 nm.

As additionally shown in FIG. 7, the seed layer was 708 was deposited directly on the upper surface of the SUL structure 606, particularly the upper surface of the second SUL 724. The seed layer 708 included Ni-6W and had a thickness of 5 nm.

As further shown in FIG. 7, the intermediate layer 710 was deposited directly on the upper surface of the seed layer 708. The intermediated layer 710 included Ru and had a thickness of 14 nm.

The granular recording layer 712, as illustrated in FIG. 7, was deposited directly on the intermediate layer 710. The granular recording layer 712 possessed a three-layered structure. The first granular cording layer 726 (i.e. the gram granular recording layer positioned closest to the substrate) was formed to a thickness of 5 nm using a [Co-10Cr-22Pt]-5SiO$_2$-3TiO$_2$-1.5Co$_3$O$_4$ sputtering target. The second granular recording layer 728 was formed to a thickness of 3 nm using a [Co-10Cr-22.5Pt]-4SiO$_2$-2.5Co$_3$O$_4$ sputtering target. The third granular recording layer 730 (i.e. the granular recording layer closest to the upper surface of the medium 700) was formed to a thickness of 4 nm using a [Co-26Cr-10.5Pt]-4SiO$_2$-1Co$_3$O$_4$ sputtering target.

As also shown n FIG. 7, the ferromagnetic metal layer 714 was deposited directly on the upper surface of the magnetic recording layer 712, particularly the upper surface of the third granular recording layer 730. The ferromagnetic metal layer 714 was formed to a thickness of 4 nm using a Co-17Cr-14Pt-6B sputtering target.

Figure 8:
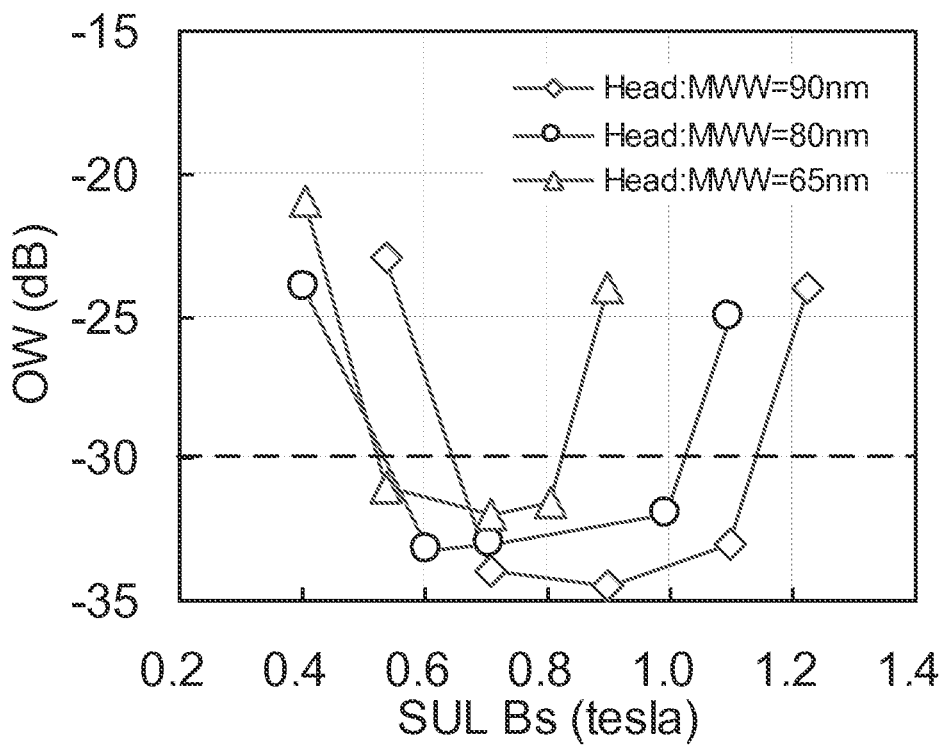
FIG. 8 shows plots of the Overwrite (OW) versus the magnetic flux density (Bs) at 25° C. of various alloys included in the soft underlayer (SUL) structure of the perpendicular magnetic recording medium of FIG. 7.

As finally shown in FIG. 7, the DLC protective layer 716 was deposited directly on the upper surface of the ferromagnetic metal layer 714, and the lubricant layer 718 was formed directly on the DLC protective layer 716. The lubricant layer 718 includes a lubricant formed via diluting a perfluoroalkylpolyether-based material with a fluorocarbon material. The thickness of the DLC protective layer 716 and the lubricant layer 718 were 2.7 nm and 1 nm, respectively, FIG. 8 shows plots of the Overwrite (OW), as measured by a spinstand test, versus the magnetic flux density (Bs) at 25° C. of the alloys listed in Table 1, which are included in the first and second SULs 722, 724 of the perpendicular magnetic recording medium 700. Various recording heads having different MWW were used for this measurement. The value of the OW corresponds to the degree of writeability in the perpendicular recording medium 700, where a lower value corresponds to improved writeability. To achieve good writeability in the perpendicular recording medium 700, the value of OW should preferably be below −30 (dB) (which is indicated by the dotted line in FIG. 8).

Figure 9:
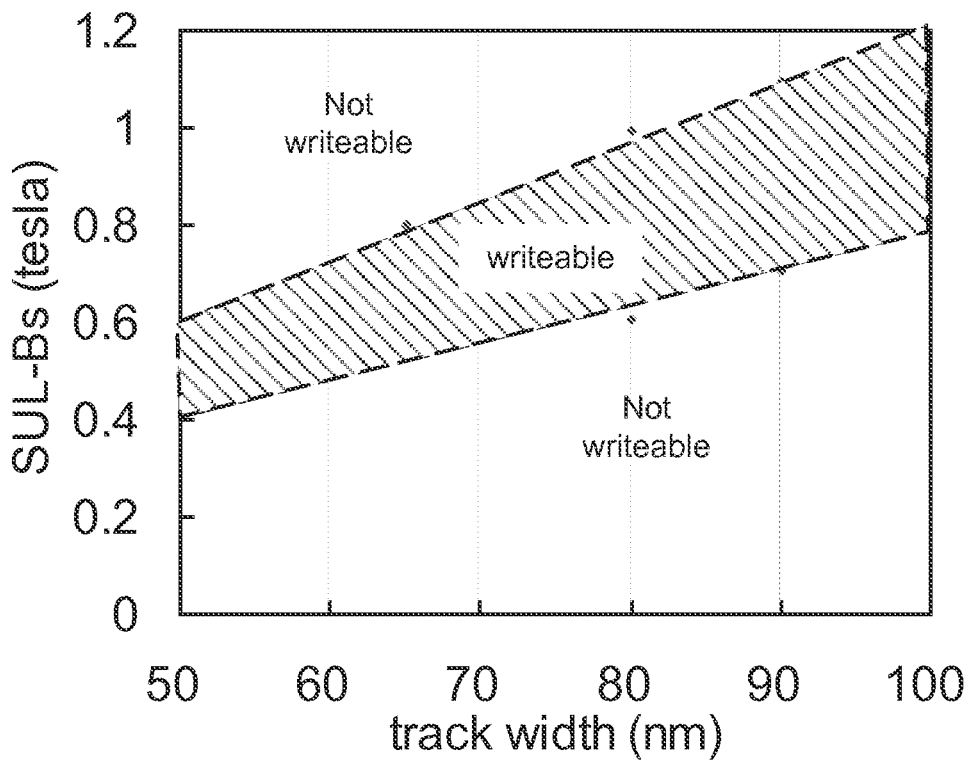
FIG. 9 is a graph illustrating the relationship between the magnetic write width (MWW) of a recording head and the Bs of the SUL structure included in the perpendicular magnetic recording medium of FIG. 7.

As indicated in FIG. 8, excessively low Bs and excessively high Bs do not yield good writeability. Moreover, as also shown in FIG. 8, there is an optimum range for the Bs of the SUL structure 706 in the perpendicular recording medium 700, where such range is further dependent on the MWW of the recording head. For example, the optimum Bs range of the SUL structure 706 is between 0.7 tesla and 1.1 tesla for a recording head with a 90 nm MWW, whereas the optimum Bs range of the SUL structure 706 is between 0.5 tesla and 0.8 tesla for recording head with a 65 nm MWW. The relationship between the optimum ranges for the Bs of the SUL structure 706 and track width, specifically the MWW, of the recording head is visually summarized in FIG. 9.

The results of Exemplary Embodiment 1 indicate that if the Bs of the SUL structure 706 is excessively low, the magnetic moment therein will be easily saturated by the head field, thus degrading the writeability of the perpendicular recording medium 700. However, if a recording head with a narrower MWW is used, the above saturation issue may be avoided and/or mitigated because a narrower MWW is generally associated with a weaker head field. Accordingly, it has been found herein that it is preferable to use a comparatively low Bs SUL structure 706 in conjunction with recording head having a narrow MWW. Conversely, if the Bs of the SUL structure 706 is excessively high, the permeability of the SUL structure 706 may be too low because there will be a stronger antiferromagnetic coupling between the first single SUL 722 and the second single SUL 724, which will degrade the writeability of the perpendicular recording medium 700. However, if a recording head with a wider MWW is used, this particular hard-to-write issue may be avoided and/or mitigated because a recording head with a wider MWW generally has a stronger head field. Accordingly, it has been found herein that it is preferable to use a comparatively high Bs SUL structure 706 in conjunction with recording head having a wide MWW.

Based on the foregoing, the following condition should thus be satisfied to achieve good writeability in the perpendicular recording medium 700 at room temperature:

$$0.008 \times MWW \leq Bs(RT) \leq 0.012 \times MWW.$$

Exemplary Embodiment 2

The perpendicular recording medium described in Exemplary Embodiment 2 includes layers with the same structure, materials and thickness as the perpendicular recording medium 700 described in Exemplary Embodiment 1, except for the composition of the first and second single SUB 722, 724 of the SUL structure 706. For instance, while the coupling layer 720 and thickness of the SUL structure 706 remained the same as in Exemplary Embodiment 1, the particular Co—Fe—Ta—Zr alloys used in the first and second single Sins for this embodiment were different. The particular Co—Fe—Ta—Zr alloys used in the first and second single SULs for this embodiment are provided in Table 2 below.

TABLE 2

| | Co (at. %) | Fe (at. %) | Ta (at. %) | Zr (at. %) | Bs at 25° C. (Tesla) | Co_C/ [Co_c + Fe_c] |
|---|---|---|---|---|---|---|
| Ex. 2-0 | 32.0 | 47.0 | 15.0 | 7.0 | 0.65 | 0.41 |
| Ex. 2-1 | 42.0 | 36.5 | 14.5 | 7.0 | 0.65 | 0.54 |
| Ex. 2-2 | 65.0 | 23.0 | 14.0 | 7.0 | 0.65 | 0.74 |
| Ex. 2-3 | 64.0 | 15.5 | 13.5 | 7.0 | 0.65 | 0.81 |
| Ex. 2-4 | 19.0 | 60.5 | 13.5 | 6.0 | 0.75 | 0.24 |
| Ex. 2-5 | 31.0 | 49.0 | 14.0 | 6.0 | 0.75 | 0.39 |
| Ex. 2-6 | 43.0 | 37.5 | 13.5 | 6.0 | 0.75 | 0.53 |
| Ex. 2-7 | 57.0 | 4.0 | 13.0 | 6.0 | 0.75 | 0.70 |
| Ex. 2-8 | 32.0 | 47.0 | 14.0 | 7.0 | 0.70 | 0.41 |
| Ex. 2-9 | 42.0 | 37.5 | 13.5 | 7.0 | 0.70 | 0.53 |
| Ex. 2-10 | 54.0 | 26.0 | 13.0 | 7.0 | 0.70 | 0.68 |
| Ex. 2-11 | 67.0 | 13.5 | 12.5 | 7.0 | 0.70 | 0.83 |

Figure 10:
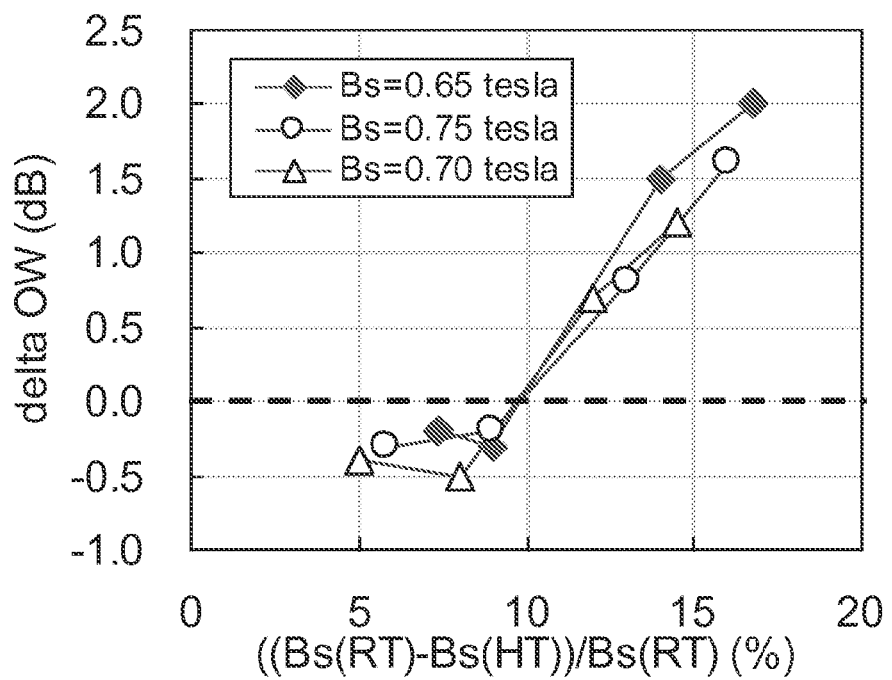
FIG. 10 shows plots of ((Bs(RT)-Bs(HT))/Bs(RT) versus delta OW for the perpendicular magnetic recording medium of FIG. 7 having various SUL alloys included therein, where Bs(RT) corresponds to the Bs of the SUL alloy at room temperature and Bs(HT) corresponds to the Bs of the SUL alloy at high temperature (e.g., 85° C.).

FIG. 10 shows plots of ((Bs(RT)-Bs(FIT))/Bs(RT) versus delta OW of the perpendicular magnetic recording medium 700 having the SUL alloys of Table 2 included therein. It is important to note that a recording head with a 65 nm MWW was used to generate the data displayed in each of these plots. The value of ((Bs(RT)-Bs(HT)),Bs(RT) corresponds to the difference between the Bs of the SUL structure at 25° C. versus 85° C. A lower ((Bs(RT)-Bs(HT))/Bs(RT) value indicates that the Bs of the SUL structure at 85° C. does not decrease significantly as compared to the Bs of said structure at 25° C. The value of delta OW corresponds to the degradation of the OW at high temperature, which may he represented by the following equation:

$$\text{delta}OW = OW(HT) - OW(RT) \quad (4)$$

where OW(HT) is the value of the OW at high temperature (85° C.) and OW(RT) is the value of the OW at room temperature (25° C.). If the delta OW is a positive value, writeability is degraded at high temperature. Preferably, the value of delta OW needs to be below 0 to achieve good writeability at high temperature.

As indicated in FIG. 10, the delta OW is below 0 if the value of ((Bs(RT)-Bs(HT)/Bs(RT) is less than 10%. Accordingly, to achieve good writeability at high temperature, the difference between the Bs of the SUL structure at room temperature and the Bs of the SUL structure at high temperature should be 10% of less. In instances where the Bs(HT)) and Bs(RT) varies by more than 10%, the Bs of the SUL structure at high temperature becomes too low and the magnetic moment in said SUL structure will become saturated by the head field, thus degrading the writeability of the perpendicular recording medium at high temperature.

From the foregoing, the following condition should thus be satisfied to achieve good writeability in the perpendicular recording medium at high temperature:

$$\left\{ \frac{Bs(RT) - Bs(HT)}{Bs(RT)} \right\} \leq 0.1.$$

Figure 11:
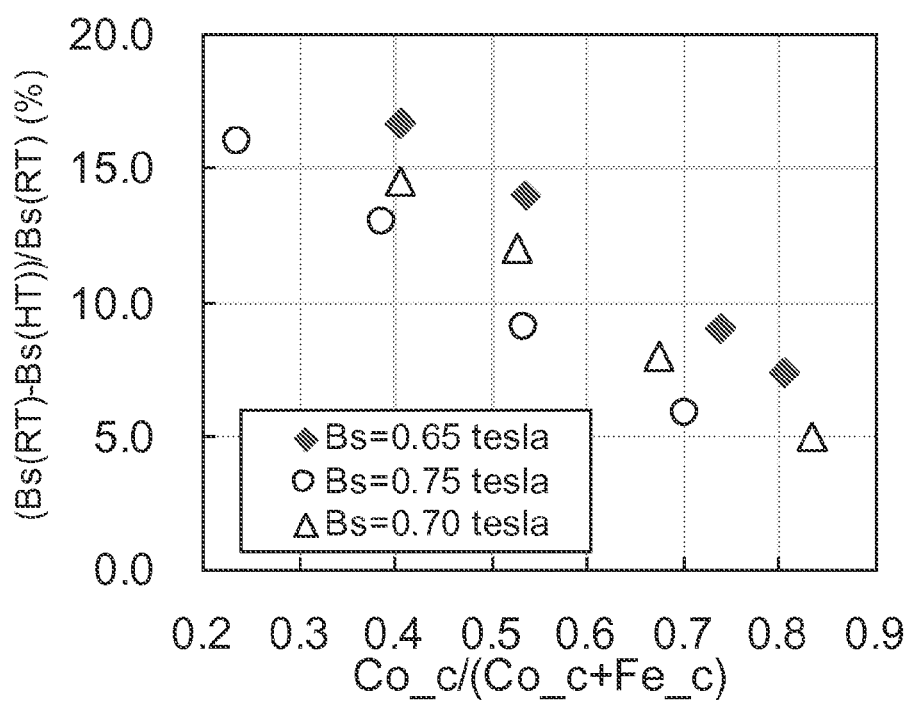
FIG. 11 shows plots of ((Bs(RT)-Bs(HT))/Bs(RT) versus the ratio of the atomic percentage of Co to the combined atomic percentages of Co and Fe (Co_c/(Co_c+Fe_c)) in the SUL alloys, where Bs(RT) again corresponds to the Bs of the SUL alloy at room temperature and Bs(HT) corresponds to the Bs of the SUL alloy at high temperature (e.g., 85° C.).

FIG. 11 shows the correlation between ((Bs(RT)-Bs(HT))/Bs(RT) and the ratio of the Co amount to the total amount of Co and Fe (Co_c/(Co_c+Fe_c)) in the SUL alloys of Table 2. The Co and Fe amounts are expressed in atomic percent. As indicated in FIG. 11, the rate at which the Bs of the SUL structure may decrease at high temperature may be suppressed and/or reduced by increasing the Co amount in the alloy. As discussed previously, one reason to explain this finding may be due to the fact that Co has a higher Curie temperature than Fe. A higher Curie temperature corresponds to a higher temperature at which the permanent or spontaneous magnetization of a magnetic material disappears. A magnetic material having a higher Curie temperature may thus have a Bs that decreases at a slower rate at high temperatures as compared to a magnetic material having a lower Curie temperature. The log lower decreasing rate of the moment in Co with increasing temperature can affect the lower decreasing rate of Bs in SUL alloys. Consequently, a SUL structure having a higher Co amount may increase the overall Curie temperature of the SUL structure, which in turn may result in the SUL structure having an overall Bs that decreases at a slower rate at high temperatures as compared to a SUL structure having a lower amount of Co and therefore a lower overall Curie temperature.

Moreover, based on results shown in FIG. 11, several conditions may be specified to achieve good writeability in the perpendicular recording medium at high temperatures. For instance, to achieve ((Bs(RT)-Bs(HT))/Bs(RT)≤0.1 for a SUL structure having a Bs(RT) of 0.65 Tesla, the atomic percentage of Co in the alloy is preferably:

$$\frac{Co\_c}{[Co\_c + Fe\_c]} \geq 0.7.$$

Additionally, to achieve ((Bs(RT)-Bs(HT))/Bs(RT)≤0.1 for a SUL structure having a Bs(RT) of 0.70 Tesla, the atomic percentage of Co in the alloy is preferably:

$$\frac{Co\_c}{[Co\_c + Fe\_c]} \geq 0.6.$$

Father, to achieve ((Bs(RT)-Bs(HT))/Bs(RT)≤0.1 for a SUL structure having a Bs(RT) of 0.75 Tesla, the atomic percentage of Co in the alloy is preferably:

$$\frac{Co\_c}{[Co\_c + Fe\_c]} \geq 0.5.$$

Finally, in preferred approaches, the general relation should be satisfied to achieve good writeability at high temperature:

$$\frac{Co\_c}{[Co\_c + Fe\_c]} \geq 2 - 2 \cdot Bs(RT).$$

Exemplary Embodiment 3

The perpendicular recording medium described in Exemplary Embodiment 3 includes layers with the same structure, materials and thickness as the perpendicular recording medium 700 described in Exemplary Embodiment 1, except for composition of the first and second SULs 722, 724 of the SUL structure 706. For instance, while the coupling layer 720 and thickness of the SUL structure 706 remained the same as in Exemplary Embodiment 1, the particular alloys used in the first and second single SULs for this embodiment were different. Specifically, in this particular embodiment, comparative examples were prepared in which the amount of Co (in atomic percent) to the total amount of Co and Fe (in atomic percent) in the alloys were fixed to 0.81 but the non-magnetic additives therein were varied. The particular alloys used in the first and second SULs for this embodiment are provided in Table 3 below.

TABLE 3

| Alloys in 1$^{st}$ and 2$^{nd}$ SULs | Bs at 25° C. | Co_C/ [Co_c + Fe_c] | Delta OW (db) |
|---|---|---|---|
| Ex. 3-0 | 64Co—15.5Fe—13.5Ta—7Zr | 0.65 | 0.81 | −0.2 |
| Ex. 3-1 | 66Co—15Fe—19Ta | 0.66 | 0.81 | −0.3 |
| Ec. 3-2 | 64Co—15.5Fe—13.5Ta—7B | 0.65 | 0.81 | −0.2 |
| Ex. 3-3 | 64Co—15.5Fe—13.5Ta—7W | 0.65 | 0.81 | −0.1 |
| Ex. 3-4 | 64Co—15.5Fe—13.5Ta—7Cr | 0.65 | 0.81 | −0.2 |

Based on the results above, it was discovered that incorporation of the alloys listed in Table 3 into the SUL structure can prevent the degradation of the writeability of the perpendicular recording medium at high temperature.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A perpendicular magnetic recording medium, comprising:
   a substrate; and
   a soft magnetic underlayer structure positioned above the substrate,
   wherein the soft magnetic underlayer structure comprises:
      a coupling layer;
      a first soft underlayer positioned above the coupling layer; and
      a second soft underlayer positioned below the coupling layer,
   wherein a difference between a magnetic flux density of the soft magnetic underlayer structure at 25° C. and a magnetic flux density of the soft underlayer structure at 85° C. is less than or equal to about 10% of the magnetic flux density of the soft magnetic underlayer structure at 25° C.,
   wherein at least one of the soft underlayers comprises a soft magnetic alloy including Co and Fe, wherein an amount of Co in the soft magnetic alloy satisfies the condition:

$$\frac{Co\_c}{[Co\_c + Fe\_c]} \geq 2 - 2 \cdot Bs(RT),$$

where Co_c represents the atomic percentage of Co in the soft magnetic alloy, Fe_c represents the atomic percentage of Fe in the soft magnetic alloy, and Bs(RT) represents the magnetic flux density of the soft underlayer structure in Teslas.

2. The perpendicular recording medium as recited in claim 1, wherein the soft magnetic underlayer structure has a thickness in a range between about 5 nm to about 40 nm.

3. The perpendicular recording medium as recited in claim 1, wherein a difference between the magnetic flux density of the soft magnetic underlayer structure at 25° C and the magnetic flux density of the soft underlayer structure at 85° C. is less than or equal to 7% of the magnetic flux density of the soft magnetic underlayer structure at 25° C.

4. The perpendicular recording medium as recited in claim 1, wherein the magnetic flux density (in Teslas) of the soft magnetic underlayer structure at 25° C. (Bs(RT)) satisfies the condition:

$$0.008 * MWW \leq Bs(RT) \leq 0.012 * MWW,$$

where MWW is the magnetic write width (in nanometers) of a magnetic recording head configured to produce a magnetic field applied to the perpendicular recording medium.

5. The perpendicular recording medium as recited in claim 4, wherein the MWW of the recording head is in a range between about 40 nm to about 100 nm.

6. The perpendicular recording medium as recited in claim 4, wherein the Bs(RT) of the soft magnetic underlayer structure is in a range between about 0.4 Tesla to less than about 1.2 Tesla.

7. The perpendicular recording medium as recited in claim 1, wherein the soft magnetic alloy, in addition to the Co and Fe, includes at least one material selected from the group consisting of: Ta, Zr, B, W and Cr.

8. The perpendicular recording medium as recited in claim 1, wherein the coupling layer comprises Ru or a Ru-based alloy.

9. The perpendicular recording medium as recited in claim 1, further comprises a granular magnetic recording layer positioned above the soft underlayer structure, wherein the granular magnetic recording layer comprises at least three granular layers, wherein at least one of the three granular layers comprises Co, Cr, Pt and one or more oxides selected from the group consisting of: $SiO_2$, $TiO2_2$, and $Co_3O_4$.

10. The perpendicular recording medium as recited in claim 1, wherein the medium is a hard disk.

11. A magnetic data storage system, comprising:
   at least one magnetic head;
   a magnetic medium as recited in claim 1;
   a drive mechanism for passing the magnetic medium over the at least one magnetic head; and
   a controller electrically coupled to the at least one magnetic head for controlling operation of the at least one magnetic head.

12. A perpendicular recording medium, comprising:
   a substrate;
   a soft magnetic underlayer structure positioned above the substrate, the soft magnetic underlayer structure comprising:
      a coupling layer;
      a first soft underlayer positioned above the coupling layer; and
      a second soft underlayer positioned below the coupling layer,
   wherein a difference between a magnetic flux density of the soft magnetic underlayer structure at 25° C., and a magnetic flux density of the soft underlayer structure at 85° C. is less than or equal to about 10% of the magnetic flux density of the soft magnetic underlayer structure at 25° C.; and
   a granular magnetic recording layer positioned above the soft underlayer structure, the granular magnetic recording layer comprising at least three granular layers, wherein at least one of the three granular layers comprises Co, Cr, Pt and one or more oxides selected from the group consisting of: $SiO_2$, $TiO_2$, and $CO_3O_4$.

13. The perpendicular recording medium as recited in claim 12, wherein the first soft underlayer and the second soft underlayer each include a soft magnetic alloy, the soft magnetic alloy comprising Co, Fe and at least one material selected from the group consisting of: Ta, Zr, B, W and Cr, wherein an amount of Co in the soft magnetic alloy satisfies the condition:

$$\frac{Co\_c}{[Co\_c + Fe\_c]} \geq 2 - 2 \cdot Bs(RT),$$

where Co_c represents the atomic percentage of Co in the soft magnetic alloy, Fe_c represents the atomic percentage of Fe in the soft magnetic alloy, and Bs(RT) represents the magnetic flux density of the soft underlayer structure in Teslas.

14. A perpendicular recording medium comprising:
   a substrate; and
   a soft magnetic underlayer structure positioned above the substrate, the soft magnetic underlayer structure comprising:
      a coupling layer including a Ru or a Ru-based alloy;
      a first soft underlayer positioned above the coupling layer; and
      a second soft underlayer positioned below the coupling layer,
   wherein a difference between a magnetic flux density of the soft magnetic underlayer structure at 25°C. and a magnetic flux density of the soft magnetic underlayer structure at 85° C. is less than or equal to about 10% of the magnetic flux density of the soft magnetic underlayer structure at 25° C.,
   wherein the soft magnetic underlayer structure has a thickness in a range from 5 nm to 30 nm,
   wherein the perpendicular magnetic recording medium is a hard disk,
   wherein the first soft underlayer and the second soft underlayer each include a soft magnetic alloy, the soft magnetic alloy comprising Co, Fe and at least one material selected from the group consisting of: Ta, Zr, B, W and Cr.
   wherein an amount of Co in the soft magnetic alloy satisfies the condition:

$$\frac{Co\_c}{[Co\_c + Fe\_c]} \geq 2 - 2 \cdot Bs(RT),$$

where Co_c represents the atomic percentage of Co in the soft magnetic alloy, Fe_c represents the atomic percentage of Fe in the soft magnetic alloy, and Bs(RT) represents the magnetic flux density of the soft underlayer structure in Teslas.

15. The perpendicular recording medium as recited in claim 14, wherein the magnetic flux density (in Teslas) of the soft magnetic underlayer structure at 25° C (Bs(RT)) satisfies the condition:

$$0.008 * MWW \leq Bs(RT) \leq 0.012 * MWW,$$

where MWW is the magnetic write width (in nanometers) of a magnetic recording head configured to produce a magnetic field applied to the perpendicular recording medium.

16. The perpendicular recording medium as recited in claim 15, wherein the MWW of the recording head is in a range between about 40 nm to about 100 nm.

17. The perpendicular recording medium as recited in claim 15, wherein the Bs(RT) of the soft magnetic underlayer structure is in a range between about 0.4 Tesla to less than about 1.2 Tesla.

18. The perpendicular recording medium as recited in claim 14, further comprises a granular magnetic recording layer positioned above the soft underlayer structure, wherein the granular magnetic recording layer comprises at least three granular layers.

* * * * *